US007526371B2

(12) United States Patent
Seeberger et al.

(10) Patent No.: US 7,526,371 B2
(45) Date of Patent: Apr. 28, 2009

(54) METHOD AND DEVICE FOR THE POSITION-DEPENDENT CONTROL OF A MOBILE ELEMENT IN A MOTOR VEHICLE

(75) Inventors: Jürgen Seeberger, Reckendorf (DE); Carsten Abert, Hassfurt (DE)

(73) Assignees: Brose Fahrzeugteile GmbH & Co., Hallstadt (DE); Kommanditgesellschaft, Hallstadt, Hallstadt (DE)

( * ) Notice: Subject to any disclaimer, the term of this patent is extended or adjusted under 35 U.S.C. 154(b) by 631 days.

(21) Appl. No.: 11/149,440

(22) Filed: Jun. 10, 2005

(65) Prior Publication Data

US 2006/0009892 A1    Jan. 12, 2006

Related U.S. Application Data

(63) Continuation of application No. PCT/DE03/04089, filed on Dec. 5, 2003.

(30) Foreign Application Priority Data

Oct. 12, 2002    (DE) ................ 102 58 476

(51) Int. Cl.
   *B60G 17/016*    (2006.01)
(52) U.S. Cl. .................. 701/38; 180/287; 180/289; 318/264; 318/265; 318/266; 318/267; 318/281; 318/282; 318/283; 318/284; 318/285; 318/286; 340/438
(58) Field of Classification Search .................. 701/38; 180/289, 287; 318/264–267, 281–286; 340/438, 340/686
See application file for complete search history.

(56) References Cited

U.S. PATENT DOCUMENTS

| 5,483,135 | A | * | 1/1996 | Parks ........................ 318/469 |
| 5,877,955 | A | * | 3/1999 | Struyk ........................ 700/69 |
| 5,932,931 | A | * | 8/1999 | Tanaka et al. .............. 307/10.1 |
| 6,064,165 | A | * | 5/2000 | Boisvert et al. ............. 318/465 |
| 6,084,376 | A | * | 7/2000 | Piedl et al. .................. 318/605 |
| 6,104,185 | A | * | 8/2000 | Lamm et al. ............. 324/207.2 |
| 6,114,822 | A | * | 9/2000 | Ubelein et al. .............. 318/469 |
| 6,552,506 | B2 | * | 4/2003 | Kramer et al. ............. 318/466 |
| 6,667,562 | B1 | * | 12/2003 | Heinrich .................... 307/10.1 |

(Continued)

FOREIGN PATENT DOCUMENTS

WO    WO0029701    5/2000

(Continued)

*Primary Examiner*—Thomas G Black
*Assistant Examiner*—Wae Louie
(74) *Attorney, Agent, or Firm*—Jacob Eisenberg

(57) ABSTRACT

The present invention concerns a method for the position-dependent control of a mobile element in a motor vehicle, wherein the element is movable in a drive movement by an electrically powered positioning device, wherein the positioning device has several different operational modes, and characteristics of a drive signal of the positing device, in particular a waviness of a drive current, are used for the determination of the position of the element. According to the invention, a characteristic variable, which influences the drive movement of the positioning device, and/or a specific value, which characterizes the positioning device, are evaluated for the determination of an error value of the determined position of the mobile element, and that the operating modes of the positioning device are controlled in dependence of the determined error value.

22 Claims, 3 Drawing Sheets

U.S. PATENT DOCUMENTS

| | | | |
|---|---|---|---|
| 6,936,984 B2 * | 8/2005 | Wilson | 318/280 |
| 7,359,783 B2 * | 4/2008 | Vives et al. | 701/49 |
| 7,362,070 B2 * | 4/2008 | Games et al. | 318/605 |
| 2002/0047678 A1 * | 4/2002 | Wilson | 318/445 |
| 2003/0011336 A1 * | 1/2003 | Kramer et al. | 318/466 |
| 2003/0011361 A1 | 1/2003 | Kramer et al. | |
| 2003/0111995 A1 * | 6/2003 | Otte | 324/71.1 |
| 2005/0187688 A1 * | 8/2005 | Bigorra Vives et al. | 701/49 |
| 2006/0009892 A1 * | 1/2006 | Seeberger et al. | 701/38 |

FOREIGN PATENT DOCUMENTS

| WO | WO0194140 | 12/2001 |
|---|---|---|

* cited by examiner

METHOD AND DEVICE FOR THE POSITION-DEPENDENT CONTROL OF A MOBILE ELEMENT IN A MOTOR VEHICLE

CROSS REFERENCE TO RELATED APPLICATIONS

The present application is a continuation of International Application PCT/DE03/04089, filed Dec. 5, 2003, and further claims priority to German patent application 10258476, filed Dec. 10, 2002, the both of which are herein incorporated by reference.

BACKGROUND OF THE INVENTION

The invention concerns a method for the position-dependent control of a mobile element in a motor vehicle, wherein the element is movable in a drive movement by an electrically powered positioning device, according to the preamble of Claim 1.

Accordingly, the positioning device has several different operational modes, and characteristics of a drive signal of the positioning device, in particular a waviness of a drive current, are used for the determination of the position of the element.

The different operational modes of the positioning device can in particular contain the activation and deactivation of the automatic operation of the mobile element in one of its end positions and the adjustment of the position of the mobile element upon reaching an assigned position. However, a plurality of combinations of different functional features of the positioning device is also possible, which represent different operational modes of the positioning device.

As a characteristic feature of the drive signal, for example, the time dependent waviness of the drive current or the drive voltage for an electric motor with or without a commutator may be evaluated. Likewise, it is possible to evaluate the frequency dependent waviness of the drive current or the drive voltage in the frequency domain.

With commutating brush-type DC motors, the method according to the preamble is known as "ripple count." With such electric motors, the motor load current is superimposed with current impulses (ripples). These current peaks are generated by the periodic reversion of the rotor caused by the commutator. Advantage is then taken of the fact that the path covered by the mobile element through the electric positioning device correlates with the time dependent occurrence of the current peaks of the drive current of the positioning device. That is, a defined track section on the positioning path of the mobile element can be assigned to each period between two current peaks of the drive current. If the current peaks are counted during the positioning movement of the mobile element, the positioning path can be calculated.

The "ripple-count" method is equally applicable to an electric motor without commutator. Here, the period of the AC current necessary for driving the rotor serves as a characteristic feature of the drive signal. A defined track section on the positioning path of the mobile element can be assigned to each period, for example, between two maxima of the drive current.

The "ripple-count" method works with brush commutating DC motors without problems as long as a critical load torque does not have to be exceeded during movement of the mobile element, or the electric motor is not in the starting or switching off phase. In these critical operating states, the current impulses for the determination of the positioning path are difficult to evaluate, or cannot be evaluated at all. This leads necessarily to a deviation between the position of the mobile element determined using the current impulses and its real position. This error leads, in particular when the "ripple-count" method is used for power windows of automobiles, to the following problem. The power window's crush guard may only be deactivated during the automatic closing process when the window's opening gap is only four millimeters wide. If the error in determining the position is, for example, in the range of a tenth of a millimeter, this legal requirement can no longer be reliably met.

SUMMARY OF THE INVENTION

Accordingly, a goal of the present invention is to provide a method according to the preamble of claim 1 and a device that, despite the described critical operating states of the electrical positioning device, provides for a safe and reliable operation of the positioning device.

The method according to the invention evaluates a characteristic variable influencing the drive movement of the positioning device and/or a specific value characterizing the positioning device for determining an error value of the determined position of the mobile element, and controls the operating modes of the positioning device in dependence of the determined error value.

The characteristics that influence the drive movement of the positioning device may be, for example, the electrical power of the vehicle, the operating temperature, the rotating direction, the rotational speed or the load of the positioning device acting upon the electric motor, and the distances between the evaluated current impulses. These parameters have a temporal and direct effect on the drive movement and are hereinafter referred to as characteristic variables.

Different from that are the following parameters such as the life of the positioning device, the way and duration of the fluctuations of the vehicle's electrical power, the number of movements during its life, the specific functional parameters of the electric motor, the number and duration of drive movements without reaching an end stop, the number of reversions (i.e., the number of activations of the crush guard), the number of reversions of the rotating direction and the course of the torque expected in view of the specific shape of the positioning path, over the whole positioning path of the mobile element (for example, through the shape of the window seal in case the positioning device is a power window). These parameters do not necessarily have a direct influence on the drive movement of the positioning device, but are important features of the positioning device and its previous operating history; these parameters are hereinafter referred to as specific values of the positioning device.

For the determination of the error value, a relative determination of the error is possible, for example, through comparing with threshold values, as well as an error determination in form of an absolute value.

The method according to the invention provides for a simple and inexpensive way to control the various operating modes of the positioning device in dependence of the above mentioned parameters, so that after or during the described critical operating states of the positioning device the safety requirements of the operation of the positioning device are at all times met. This can take place, for example, through the deactivation of the automatic operation of the positioning device or through adjusting the position of the mobile element in dependence of the determined error value.

An advantageous embodiment of the method according to the invention is characterized in that a plurality of error values is determined out of a plurality of characteristic variables and/or specific values. The possibilities to control the different operating modes of the positioning device in a differentiated way in dependence of a plurality of determined error values are therefore expanded.

Further, it is advantageous to form a correlated error value out of at least two of the determined error values by means of a mathematical correlation, and to control at least one operating mode of the positioning device in dependence of the correlated error value. In particular, an addition or a multiplication are possible as mathematical correlations. In this way, several linked error values can be formed out of the number of characteristic variables and/or specific values.

For the determination of the error values it is further advantageous if at least one error value is determined in dependence of a plurality of characteristic variables and/or specific values by means of a fuzzy logic.

For the determination of relative error values the characteristic variables and/or specific values can preferably be compared with an assigned threshold value. It is thereby particularly advantageous if characteristic variables and/or specific values are transformed so that they can be compared with one or more uniform threshold values for the determination of the error values. In that way, the number of threshold values required for the method can be reduced.

In a further variation of the method in accordance with the present invention the different operating modes of the positioning device are controlled by error values determined by means of a mathematical correlation. As mentioned above, all types of mathematical correlations are possible. In particular, an embodiment of the method according to the invention is possible, in which the different operating modes of the positioning device are controlled by error values determined by means of a multi-dimensional matrix-like correlation. Thereby, complex constellations between the different characteristic variables and specific values of the positioning device can be combined with corresponding operating modes.

As already mentioned previously, the various operating modes of the positioning device differ, for example, in that at least one of the following characteristics of the positioning device is changed: positioning speed of the mobile element, activity of a crush guard, activity of an automatic operation for the automatic movement of the mobile element in a first and/or second end position and adjustment of a determined position of the mobile element in an end position. Through the variety of possible operating modes and their differentiated control by means of the above-mentioned types an intelligent control of the positioning device is provided that makes safety requirements for different user profiles under complex constellations of the evaluated parameters (characteristic variables/specific values) possible.

In four preferred and hereinafter described embodiments of the method the automatic operation of the mobile element is in a first operating mode deactivated. This can affect the automatic operation in its first end position as well as in its other end position. Further, a second operating mode is provided that is characterized in that an adjustment of the position of the mobile element is made upon reaching an end position of the mobile element. In addition, once an adjustment is made, the positioning device is placed in a basic operating mode, in which the automatic operation is activated and upon reaching an end position of the mobile element no adjustment of the position of the mobile element occurs.

A first preferred embodiment of the method according to the invention is characterized in that a plurality of the characteristic variables and/or a plurality of the specific values are gradually compared with an assigned first decision threshold value and the positioning device is placed from the basic operating mode into the first operating mode upon exceeding the first decision threshold value. Thereby, to each characteristic variable and each specific value an individual decision threshold value can be assigned, or, by means of a suitable transformation, the parameters (specific values/characteristic variables) can be compared with a common decision threshold value. It is equally possible to compare the parameters with the assigned threshold values in a parallel manner instead of a subsequent manner, that is, in a serial manner. The comparison, therefore, occurs substantially simultaneously and independent from each other.

This first embodiment of the method is further characterized in that the plurality of the characteristic variables and/or the plurality of the specific values are in addition gradually compared with an assigned second decision threshold value and the positioning device is placed from the basic operating mode into the second operating mode upon exceeding the second decision threshold value. The possibility exists also to work with a uniform decision threshold value for all parameters by means of an appropriate transformation.

A second embodiment of the method is characterized in that, in addition to the comparison of a plurality of parameters with decision threshold values, a subset of the characteristic variables and/or a subset of the specific values are compared with an assigned first threshold value and the value of an error indicator is increased by one partial error upon exceeding the first threshold value. Hence, exceeding the respective threshold value does not directly lead to a change of the operating mode of the positioning device, but leads initially to an increase of the value of a first error indicator.

The second embodiment of the method is further characterized in that the subset of the characteristic variables and/or the subset of the specific values are compared with an assigned second threshold value upon under-running the first threshold value and the value of the error indicator is increased by on partial error upon exceeding of the second threshold value.

The respectively determined value of the partial error is preferably implemented as a function of the assigned characteristic variable or the assigned specific value. In this way, a weighing of the influence of the different parameters on the error indicator is achieved in a simple manner.

In this embodiment, the error indicator is determined as a sum of the partial errors. However, it is also possible to form the error indicator by means of another suitable mathematical correlation of individual partial errors, for example, as a multiplication.

The value of the error indicator, in particular determined as sum of the partial errors, is after each increase by one partial error compared with a first decision threshold value and the positioning device is placed into the first operating mode upon exceeding the first decision threshold value.

Preferably, the value of the error indicators is compared with a second decision threshold value if the first decision threshold value has been exceeded. Upon exceeding the second decision threshold values the positioning device is then placed in the second operating mode. In this manner, the operating modes can be activated step-by-step depending on the parameters. For example, the first decision threshold value can be the acceptable error threshold up to which the automatic operation of the mobile element is possible without safety concerns. If this first decision threshold value is exceeded the automatic operation is deactivated. The comparison of the error indicator with the second decision threshold value determines whether or not in addition to the deactivation of the automatic operation an adjusting of the position of the mobile element is necessary upon reaching one of the end positions.

Alternatively, it is possible that upon exceeding of the first decision threshold value the automatic operation is not yet deactivated, but a new adjustment is proscribed upon reaching an end position the next time. In this case, the automatic operation is only then deactivated if after exceeding the first decision threshold value and before reaching an end position of the mobile element further errors (exceeding the second decision threshold value) are added, which make the deactivation of the automatic operation necessary.

Basically, it is possible to modify these embodiments so that different error indicators are used. These error indicators again can lead individually or correlated to a change of the operating mode of the positioning device.

A third embodiment of the method according to the invention is characterized in that a plurality of characteristic variables and/or a plurality of specific values are gradually compared with an assigned first threshold value and the value of an error indicator is increased by one partial error upon exceeding the first threshold value. Unlike the previous embodiment, the parameters are exclusively compared with threshold values so that they influence indirectly the control of the operating modes of the positioning device by means of the error indicator determined by the comparison. The value of the partial error is thereby preferably implemented as a function of the assigned characteristic variables or specific values.

As in the previous embodiment, the value of the error indicator is compared with a first decision threshold value and the positioning device is placed in the first operating mode upon exceeding the first decision threshold value.

Likewise, the value of the error indicator is compared with a second decision threshold value if the first decision threshold value is exceeded, and the positioning device is then placed into the second operating mode upon exceeding the second decision threshold value.

In a fourth embodiment of the method according to the invention, for the comparison with the error indicator two additional decision threshold values are used in addition to the first and second decision threshold values. The positioning device is thereby changed from the basic operating mode into the first operating mode if a subset of the characteristic variables and/or a subset of the specific values exceed an assigned first decision threshold value. In this variation, a change of the operating mode is possible by means of the error indicator, as well as a direct comparison of a parameter with a decision threshold value. The parameters can either be divided into two groups, i.e., on one hand the plurality of the parameters that influence the error indicator after a comparison with a threshold value, and on the other hand the subset of the parameters that are directly compared with a decision threshold value. Or, it is also possible that these two groups of parameters contain an intersection that control the operating modes of the positioning device, indirectly by means of the error indicator as well as directly by means of a decision threshold value.

It is further possible that the positioning device is placed from the basic operating mode into the second operating mode if the subset of the characteristic variables and/or the subset of the specific values exceed a further second assigned decision threshold value.

All previously mentioned embodiments of the method according to the invention, which have an error indicator, have in common that the error indicator is in the end position reset after an adjustment of the position of the mobile element. It is thereby also possible that the error indicator is in certain situations not completely set back to a zero level. For example, this can be beneficial if the positioning device exceeded a certain operating time or the operating temperature is too high.

The previously described method is in particular suitable for use with the positioning device for a window of an automobile, wherein the positioning device is implemented as a power window. The method may equally be used for moving a seat element in an automobile.

The task underlying the present invention is also solved by means of a device configured to execute one of the above-described methods. Such a device comprises a positioning device having a drive unit with an electric motor and an electronic unit, in particular with a micro controller, for evaluating the characteristic variables and/or the specific values and for controlling the operation and the operating modes of the positioning device, wherein the positioning device is configured for moving a window or a seat element in an automobile.

BRIEF DESCRIPTION OF THE SEVERAL VIEWS OF THE DRAWINGS

Further aspects and advantages of the method according to the invention become apparent in view of the description of three embodiments in the following drawings.

Shown are.

DETAILED DESCRIPTION OF THE INVENTION

Figure 1:
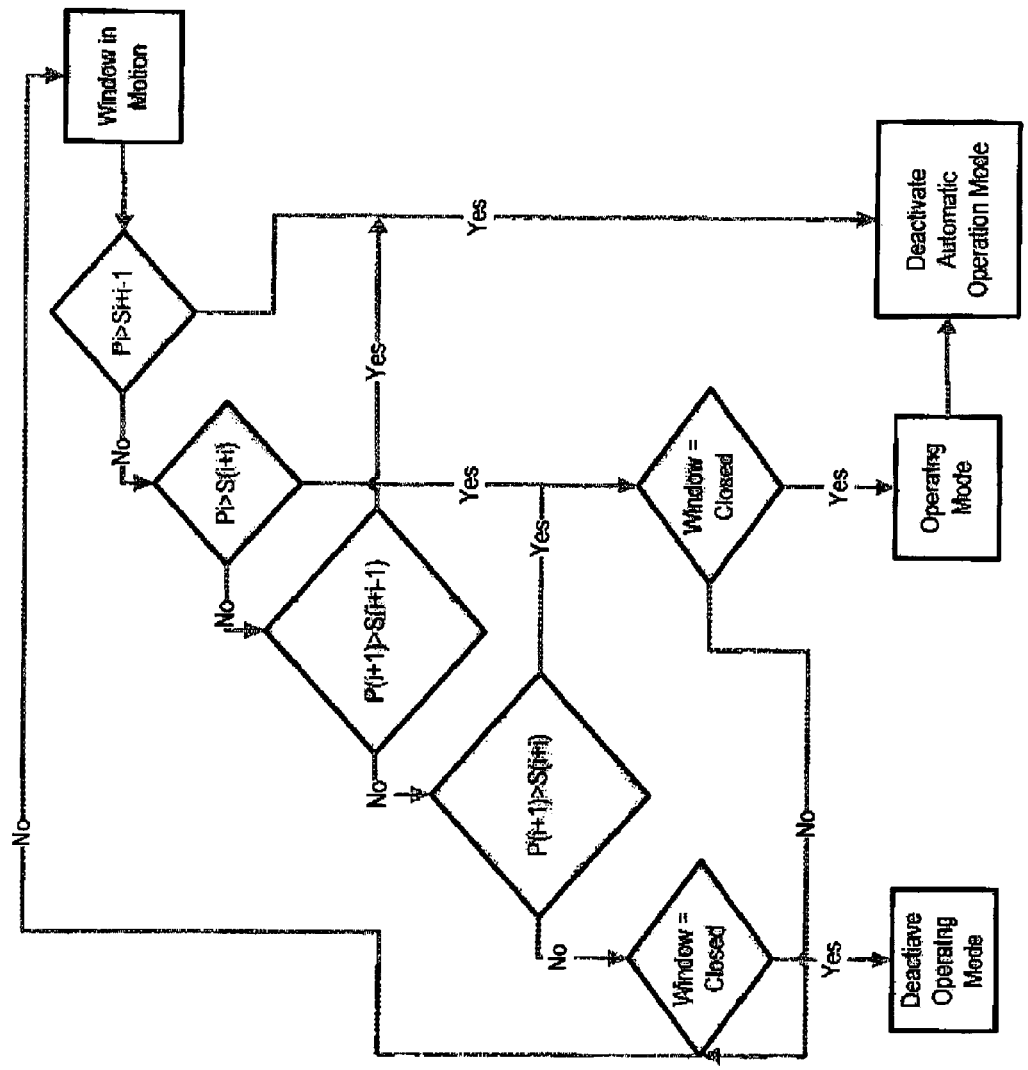
FIG. 1 is a schematic illustration of a first embodiment of the method according to the invention for controlling a power window of an automobile, wherein the parameters of the positioning device are exclusively compared with decision threshold values.

FIG. 1 shows a first embodiment of the method according to the invention in form of a flow diagram. For illustrative purposes, a selected application of the method is for a positioning device for a power window of an automobile.

Initially, the positioning device is in its basic operating mode. The position of the window determined by the positioning device then matches within the range of the acceptable error with the actual position of the window, and upon reaching one of the end positions of the window it is not necessary to perform an adjustment of the window.

While the window is moving (8), the parameter $P_i$ is first compared with a first decision threshold value $S_{i+i-1}$ (10). If this first decision threshold value $S_{i+i-1}$ is exceeded (12), the automatic operation of the positioning device is deactivated (14). For example, this may be the case if variations of the vehicle's electric power occurred such that the absolute error of the window position, which is determined by the positioning device, is in the range of equal to or greater than a few tenth of millimeters.

Hence, the error value determined by means of the comparison between the parameter $P_i$ and the first decision threshold value $S_{i+i-1}$ is a digital value. Either the decision threshold value $S_{i+i-1}$ has been exceeded, which leads to a change of the operating mode of the positioning device, or the decision threshold value has been under-run (16) so that the parameter $P_i$ is compared with a second decision threshold value $S_{i+i}$ (18). The determined error value is again a digital value resulting from the comparison of the parameter $P_i$ with the second decision threshold value $S_{i+i}$. If this second decision threshold value $S_{i+i}$ is exceeded (20), the operating mode of the positioning device is changed so that the position of the window is adjusted (26) the next time an end position is reached (24). This may be the case, for example, if a few minor errors occurred that do not require a deactivation of the automatic operation. However, an adjustment of the window position (34) is made the next time an end position is reached (28, 30, and 32). If the end portion is not reached the next time (36), the operation returns to the beginning (38, 8).

If this second decision threshold value $S_{i+i}$ is also not exceeded by the parameter $P_i$ (40), the next parameter $P_{i+1}$ is used for the comparison with the first decision threshold value $S_{i+i-1}$ (42). The consequences of exceeding or under-running the first decision threshold value $S_{i+i-1}$, when compared with the second parameter $P_{i+1}$, are identical to the previously described comparison with the first parameter $P_i$ (44). In this manner, all parameters $P_i$ (with i =1, 2, . . . ) are gradually requested and used for the determination of a digital error value.

The first decision threshold value $S_{i+i-1}$ provides that the safety requirements, which are set in dependence of the parameter $P_i$, are met in view of an automatic operation of the window, in particular into the closed end position.

The second decision threshold value $S_{i+i}$ provides that the adjustment of the position of the window in one of its end positions, wherein the position is determined by the positioning device, is made in time so that the first decision threshold value is not exceeded and, hence, the deactivating of the automatic operation is not necessary. If the positioning device is in the operating mode assigned to the adjustment, the parameters $P_i$ continue to be compared with the two decision threshold values $S_{i+i-1}$ and $S_{i+i}$, according to the illustrated process, as long as the window is moving. Only when an end position is reached, the adjustment of the determined position occurs and the positioning device is reset into the basic operating mode.

If all parameters $P_i$ have been compared with the two decision threshold values $S_{i+i-1}$ and $S_{i+i}$ and none of the threshold values has been exceeded, the positioning device is still in the basic operating mode, i.e., even when one of the end positions of the windows is reached, there is no adjustment of the position determined by the positioning device. The parameters $P_i$ are then compared with the two decision threshold values $S_{i+i-1}$ and $S_{i+i}$ while the window is moving, according to the illustrated process, in order to provide for a permanent monitoring of the positioning device.

As the parameters $P_i$ have different physical units it is useful to transform the determined values of the parameters $P_i$ so that they can be compared with a uniform first or second decision threshold value. However, it is also possible that for each parameter $P_i$ an individual first and second decision threshold value exists. For illustrative purpose, however, this embodiment is not shown in the flow diagram.

Figure 2:
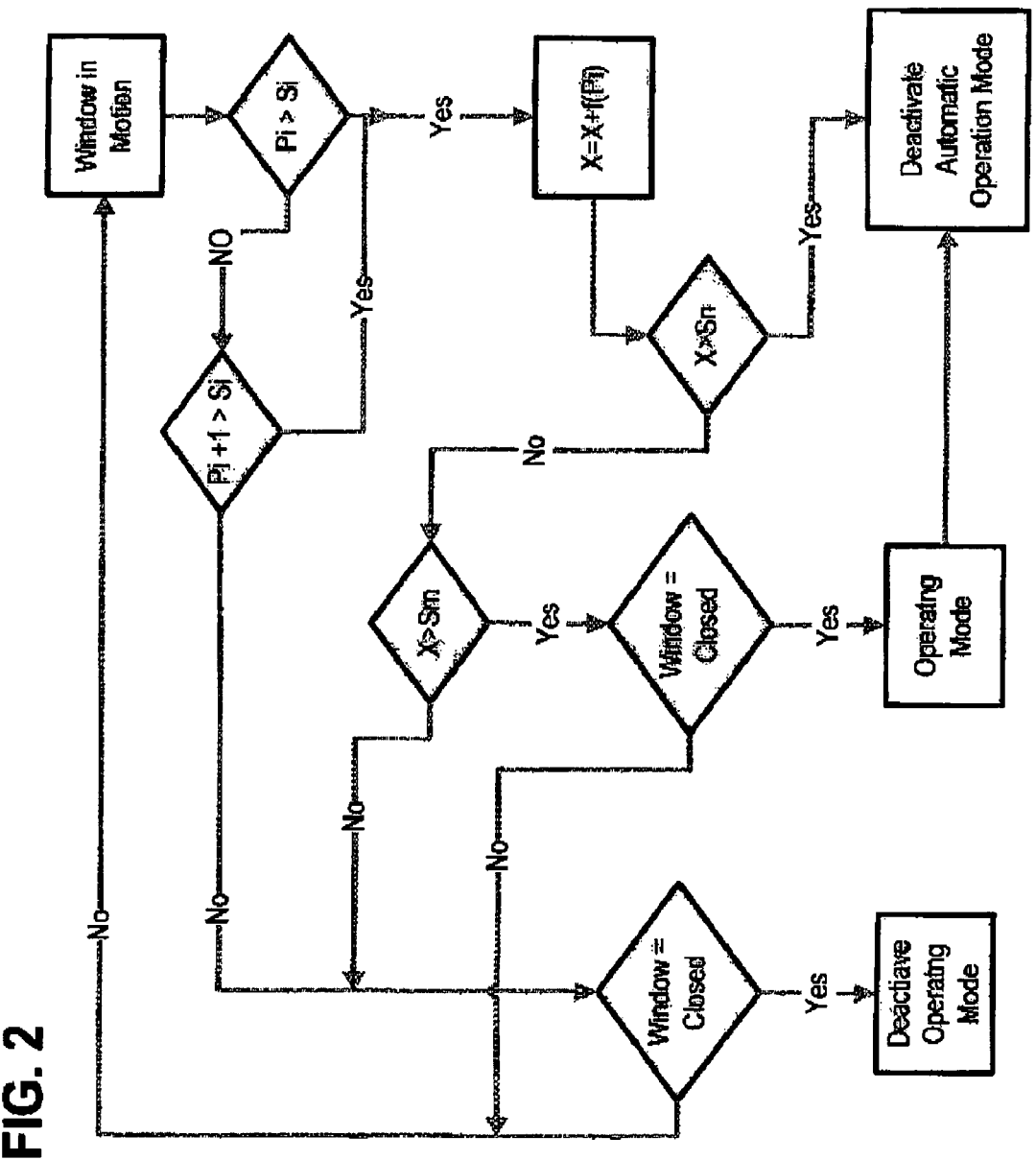
FIG. 2 is a schematic illustration of a second embodiment, wherein the parameters of the positioning device are exclusively compared with threshold values for obtaining an error indicator.

FIG. 2 shows the flow diagram of a second embodiment of the method according to the invention. Initially, like in the previous embodiment, the positioning device is in the basic operating mode. While the window is moving (42) the parameters $P_i$ are compared with a threshold value $S_i$ (42). If this threshold value $S_i$ is exceeded (44), an error indicator X is increased by one partial error $f(P_i)$ (46).

If the threshold value $S_i$ is not exceeded (48), the comparison of the next parameter $P_{i+1}$ with the threshold value $S_i$ follows (50). If the threshold value $S_i$ is then exceeded (52) the increase of the error indicator X by one partial error $f(P_{i+1})$ follows (46). Each partial error is preferably a function of the parameter $P_i$.

After each increase of the error indicator X, the error indicator X is subsequently compared with a first decision threshold value $S_n$ (54). If the decision threshold value $S_n$ is exceeded (56), the operating mode of the positioning device is changed so that its automatic operation, in particular towards the closed end position, is deactivated (58).

If the first decision threshold value $S_n$ is not exceeded (60), the error indicator X is further compared with a second decision threshold value $S_m$ (62). If this second decision threshold value $S_m$ is exceeded (64), the operating mode is deactivated (70), upon reaching one of the window's end positions (72, 74), an adjustment of the position of the window determined by the positioning device. During the movement of the window, until it reaches an end position (68), the parameters $P_i$ continue to be compared with the threshold value $S_i$ according to the previously illustrated scheme in order to provide for a permanent monitoring of the positioning device (70). If the second decision threshold value $S_m$ is not exceeded (72) or if the aforementioned threshold value $S_i$ is not exceeded by the next parameter $P_{i+1}$ (74), a determination of whether the window is in an end position (76) is made. If it is determined that the window is in an end position (78), the normal operation of the window is deactivated (80). If it is determined that the window has not reached an end position (82), the operation returns to the beginning (70, 84).

Unlike in the first embodiment of the method, not every parameter $P_i$, but the error indicator X is compared with the two decision threshold values $S_n$ and $S_m$. Therefore, the decision whether to change between two operating modes depends on several parameters $P_i$. Their influence on the error indicator X can be set so that the determined partial error $f(P_i)$ is a function of the parameter $P_i$.

Figure 3:
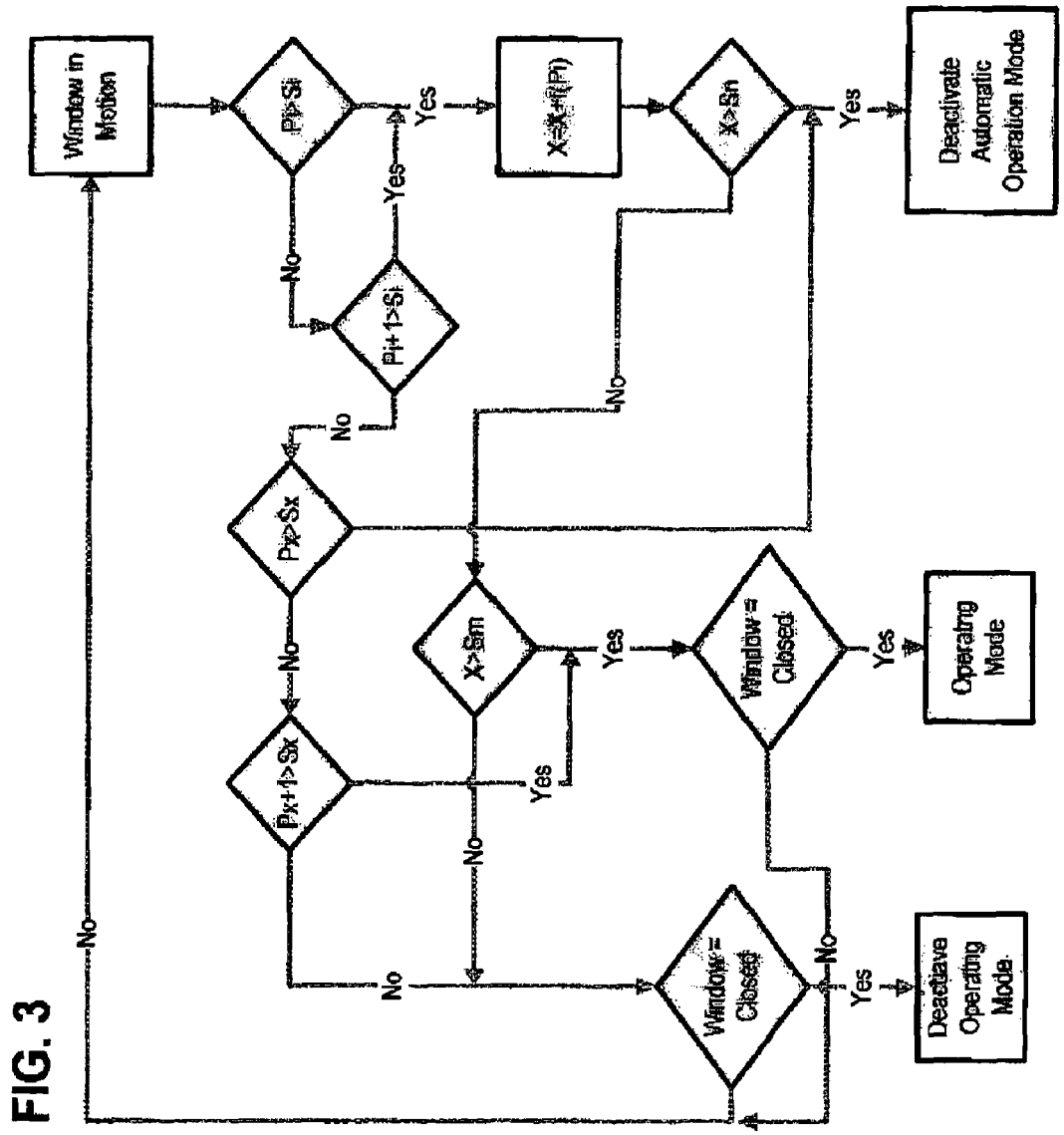
FIG. 3 is a schematic illustration of a third embodiment, wherein a first group of all parameters is compared with decision threshold values and a second group of all parameters is compared with threshold values for obtaining an error indicator.

FIG. 3 shows the third embodiment of the method according to the invention in form of a flow diagram. This embodiment is combination of the first and second embodiments. The total set of the parameters includes here two groups of parameters $P_i$ and $P_x$. The total set of the parameters is either divided into two groups of parameters, or a certain subset of parameters exists that each belong to both groups. The first group of parameters $P_i$, $P_{i+1}$ is according to the second embodiment compared with a threshold value $S_i$ (90). If this threshold value is exceeded (92), the error indicator X is increased by the value of a partial error $f(P_i)$ (94) according to the second embodiment and the increased error indicator X is compared with the decision threshold values $S_n$ and $S_m$ (96).

If all parameters $P_i$ of the first group of parameters fall below the threshold value $S_i$ (98), the parameters $P_x$, $P_{x+1}$ of the second group of parameters are, unlike in the second embodiment, one after the other compared with a decision threshold value $S_x$ (100). If the first parameter $P_x$ of the second group of parameters exceeds the decision threshold value $S_x$ (102), the operating mode without automatic operation is activated (104), just as it would be when the above error indicator X exceeds decision threshold value $S_n$ (106). If the parameter $P_x$ under-runs the decision threshold value $S_x$ (108), the next parameter $P_{x+1}$ of the second group of parameters is compared with the decision threshold value $S_x$ (110). When the parameter $P_{x+1}$ exceeds the decision threshold value $S_x$ (112), the operating mode is activated (114) which adjusts the position of the window determined by means of the positioning device upon reaching (118) one of (116) the end positions the next time. As long as one of the end positions is not yet reached (120), the parameters of both groups of parameters are polled according to the above illustrated process in order to provide for a control of the positioning device using the parameters (122). If the above error indicator is not greater than the decision threshold $S_m$ (124) or next parameter $P_{x+1}$ does not exceed decision threshold value $S_x$ (126), a determination is made whether the window is in an end position (128). If the determination is positive (130), the state of the operation mode is deactivated (132). If the determination is negative (134), the method returns (136) to the beginning (138).

What is claimed is:

1. Method for the position-dependent control of a mobile element in a motor vehicle, wherein the element is movable in a drive movement by an electrically powered positioning device, wherein the positioning device is operable in several different operational modes, and characteristics of a drive signal of the positioning device, the characteristics being at least a ripple of a drive current, are used for determination of the position of the element, comprising the steps of:
  at least one of a characteristic variable which is influenced by the drive movement of the positioning device and a specific value which characterizes the positioning device are evaluated for the determination of an error value of the determined position of the mobile element, and
  controlling the operating modes of the positioning device in dependence of the determined error value.

2. The method according to claim 1, wherein a plurality of error values is determined by at least one of a plurality of characteristic variables and specific values.

3. The method according to claim 2, wherein at least two of the determined error values are used to create a correlated error value by means of a mathematical correlation, and that at least one operating mode of the positioning device is controlled in dependence of the correlated error value.

4. The method according to claim 1, wherein at least one error value is determined as an absolute error value.

5. The method according to claim 1, wherein at least one error value is determined in dependence of at least one of a plurality of characteristic variables and specific values by means of a fuzzy logic.

6. The method according to claim 1, wherein at least one of characteristic variable and specific value is compared with an assigned threshold value for the determination of error values.

7. The method according to claim 6, wherein at least two characteristic variables and specific values are transformed so that they can be compared with one or more uniform threshold values for the determination of the error values and further comprising the step of comparing the at least two characteristic variables and specific values with the one or more uniform threshold value.

8. The method according to claim 1, wherein different operating modes of the positioning device are controlled by means of a mathematical correlation of the determined error values and the mathematical correlation is a multi-dimensional matrix-like correlation of the determined error values.

9. The method according to claim 1, wherein the different operating modes of the positioning device at least one of the following characteristics of the positioning device is changed: velocity of the mobile element, activity of a crush guard, activity of an automatic operation for the automatic movement of the mobile element into at least one end position and adjustment of a determined position of the mobile element in at least one of the at least one end position.

10. The method according to claim 9, wherein the automatic operation of the mobile element is deactivated in a first operating mode of the positioning device.

11. The method according to claim 10, wherein an adjustment of the position of the mobile element is made in a second operating mode of the positioning device upon reaching an end position of the mobile element.

12. The method according to claim 11, wherein the positioning device is placed in a basic operating mode after performing the adjustment in which the automatic operation is deactivated and no adjustment of the position of the mobile element is performed upon reaching an end position of the mobile element.

13. The method according to claim 12, wherein a plurality at least one of the characteristic variables and specific values are successively compared with an assigned first decision threshold value and the positioning device is changed from the basic operating mode into the first operating mode upon exceeding the first decision threshold value.

14. The method according to claim 13, wherein at least one of the plurality of characteristic variables and specific values are further successively compared with an assigned second decision threshold value and the positioning device is changed from the basic operating mode into the second operating mode upon exceeding the second decision threshold value.

15. The method according to claim 14, wherein a subset of the at least one of characteristic variables and specific values are compared with an assigned first threshold value and, upon exceeding the first threshold value, the value of an error value is increased by one partial error.

16. The method according to claim 15, wherein the at least one of a subset of the characteristic variables and specific values are, upon under-running the first threshold value, compared with an assigned second threshold value and upon exceeding the second threshold value the value of the error indicator is increased by one partial error.

17. The method according to claim 16, wherein the value of the error indicator after its increase by a partial error is compared with a first decision threshold value and upon exceeding the first decision threshold value the positioning device is placed into the first operating mode.

18. The method according to claim 17, wherein the value of the error indicator is compared with a second decision threshold value if the first decision threshold value is under-run, and upon exceeding the second decision threshold value the positioning device is placed in the second operating mode.

19. The method according to claim 15, wherein at least one of several characteristic variables and several specific values are gradually compared with an assigned first threshold value and upon exceeding the first threshold value the value of the error indicator is increased by one partial error.

20. The method according to claim 19, wherein the value of the error indicator is compared with a first decision threshold value and the positioning device is placed in the first operating mode upon exceeding the first decision threshold value.

21. The method according to claim 20, wherein the value of the error indicator is compared with a second decision threshold value if the first decision threshold value is under-run, and the positioning device is placed in the second operating mode upon exceeding the second decision threshold value.

22. The method according to one of the claims 21, wherein the error indicator is reset after an adjustment of the position of the mobile element in the end position.

* * * * *